April 16, 1940.　　　T. D. FUSSELL, JR　　　2,197,452
HYDRAULIC BRAKE
Filed Nov. 1, 1938　　　2 Sheets-Sheet 1
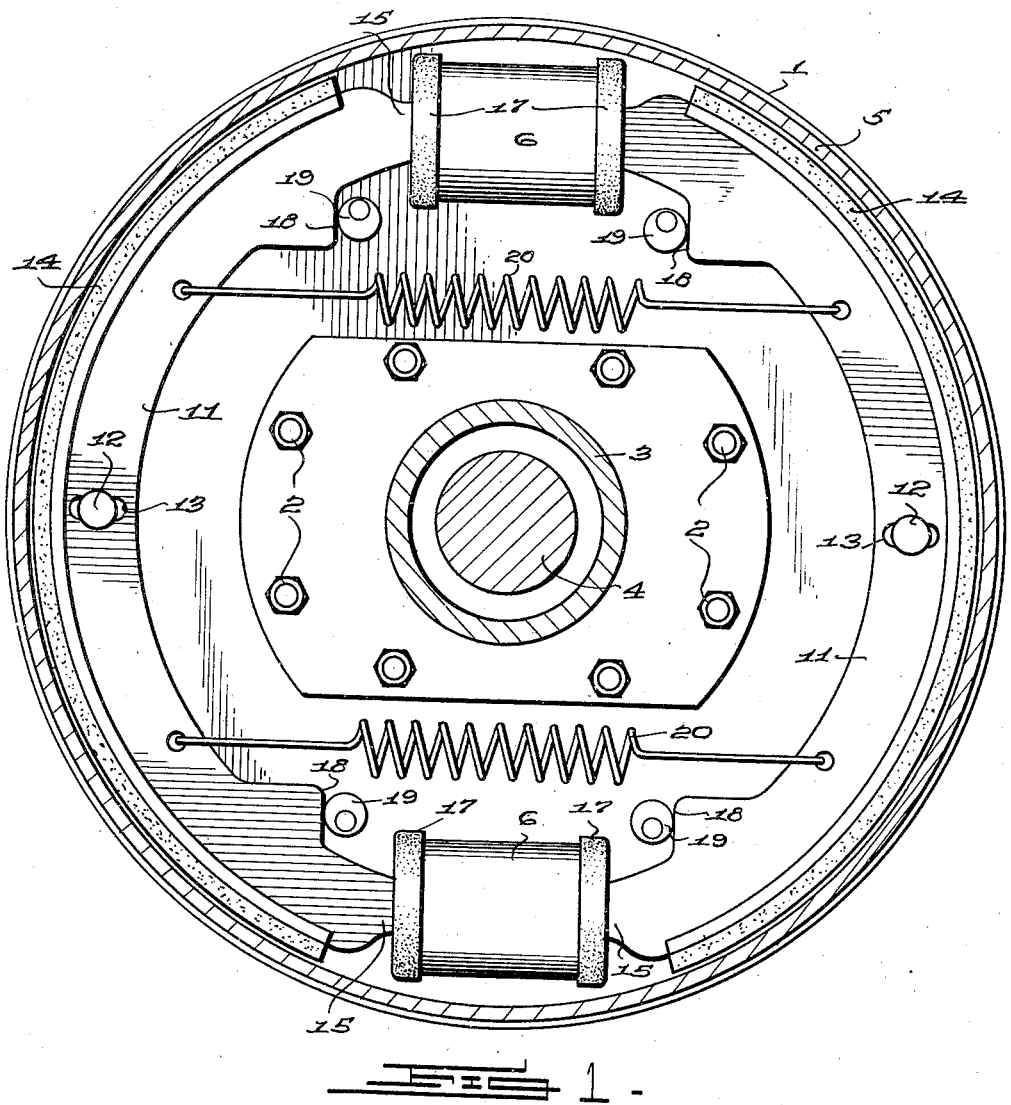
Inventor
THOMAS D. FUSSELL, JR.
By Clarence A. O'Brien
and Hyman Berman
Attorneys April 16, 1940.                T. D. FUSSELL, JR                    2,197,452
                                 HYDRAULIC BRAKE
                               Filed Nov. 1, 1938              2 Sheets-Sheet 2
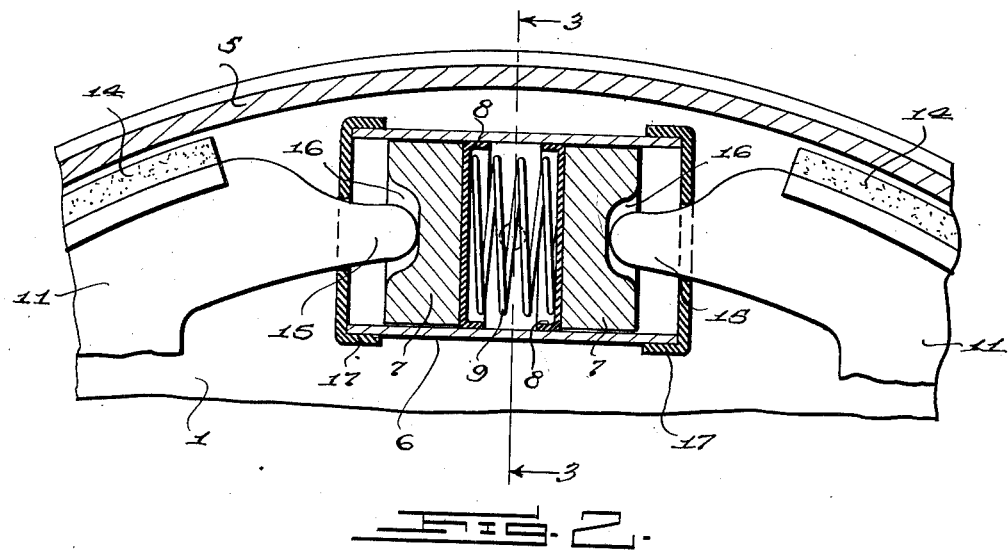
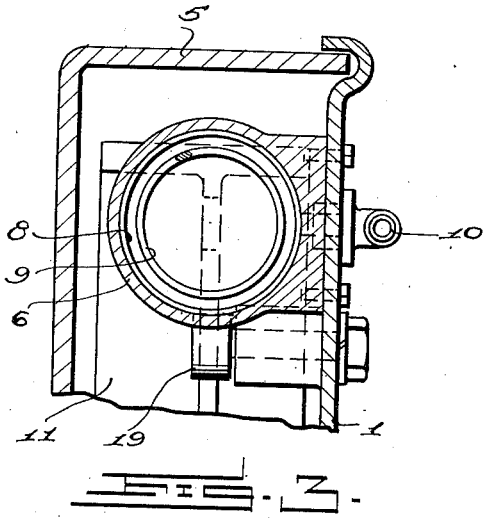
Inventor
THOMAS D. FUSSELL, JR.
By Clarence A. O'Brien
and Hyman Berman
Attorneys Patented Apr. 16, 1940

2,197,452

UNITED STATES PATENT OFFICE 2,197,452

HYDRAULIC BRAKE

Thomas Daniel Fussell, Jr., Atlanta, Ga.

Application November 1, 1938, Serial No. 238,255

1 Claim. (Cl. 188—152)

The present invention relates to new and useful improvements in hydraulic brakes particularly for automobiles and has for its primary object to provide, in a manner as hereinafter set forth, a brake embodying a novel construction, combination and arrangement of parts whereby the shoes will be evenly and uniformly applied, thereby greatly promoting the efficiency of the brake as well as increasing the life of the linings.

Another very important object of the invention is to provide a hydraulic brake of the aforementioned character comprising means whereby the shoes may be conveniently and accurately adjusted to compensate for wear as it occurs.

Other objects of the invention are to provide a hydraulic brake of the character described which will be comparatively simple in construction, strong, durable, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a hydraulic brake constructed in accordance with the present invention, showing the device installed, the drum, axle and axle housing of the vehicle being shown in section.

Figure 2 is a view in vertical longitudinal section through the upper portion of the brake.

Figure 3 is a cross sectional view, taken substantially on the line 3—3 of Fig. 2.

Referring now to the drawings in detail, it will be seen that the reference numeral 1 designates the usual stationary back plate of a brake which is rigidly secured, as at 2, on a rear axle housing 3 of the vehicle. The reference numeral 4 designates an axle in the housing 3. Associated with the back plate 1 is a drum 5 which, of course, is mounted on a rear wheel (not shown) of the automobile.

Rigidly secured on the upper and lower portions of the back plate 1 within the drum 5 are longitudinally extending double ended cylinders 6. Mounted for reciprocation in the end portions of the cylinders 6 are free pistons 7. The pistons 7 are provided with cup washers or the like 8 on their inner ends for preventing leakage. This is shown to advantage in Fig. 2 of the drawings. Coil springs 9 in the intermediate portions of the cylinders 6 yieldingly hold the pairs of pistons 7 apart. Suitable conduits 10 connect the cylinders 6, at intermediate points, with the usual hydraulic brake system of the automobile.

The reference numeral 11 designates a pair of shoes which are operable by the pistons 7 in the cylinders 6. The shoes 11 are slidably mounted on bolts 12 on the backplate 1 for movement toward and away from the drum 5, said shoes being provided with slots 13 which accommodate said bolts. The reference numeral 14 designates suitable linings on the shoes 11.

As best seen in Fig. 2 of the drawings, the shoes 11 terminate in reduced end portions 15 which extend into the cylinders 6 and are engaged in sockets or recesses 16 which are provided therefore in the outer ends of the pistons 7. The end portions 15 of the shoes 11 operate through rubber boots 17 which close the ends of the cylinders 6.

Adjacent the cylinders 6, the shoes 11 are formed to provide shoulders 18 which rest on adjusting cams or eccentrics 19 which are rotatably mounted on the back plate 1. The reference numeral 20 designates a pair of release or return springs which are connected, at their ends, to the shoes 11 on opposite sides of the bolts 12.

It is thought that the operation of the brake will be readily apparent from a consideration of the foregoing. When fluid under pressure from the brake system of the automobile enters the cylinders 6 the pistons 7 are, of course, forced outwardly thereby. Thus, the shoes 11 are moved evenly and uniformly into engagement with the drum 5 against the tension of the springs 20. Of course, when the fluid pressure in the cylinders 6 is released the shoes 11 are retracted on the supporting bolts 12 by the springs 20. By simply rotating the elements 19 the shoes 11 may be accurately adjusted as desired to compensate for wear as it occurs.

It is believed that the many advantages of a hydraulic brake constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

In a hydraulic brake including a stationary plate and a drum rotatably associated with said plate, upper and lower horizontally arranged cylinders carried by the plate and located within the drum, a pair of pistons in each cylinder, each piston having a recess in its outer face, spring means tending to force the pistons of each pair apart, means for introducing compressed fluid into the cylinders between the pistons for forcing the pistons apart, brake shoes in the drum each having a transverse centrally arranged slot therein, studs carried by the plate and passing through the slots for slidably supporting the brake shoes on the plate, springs connecting the shoes together, said shoes having reduced ends passing into the cylinders and engaging the recesses in the outer faces of the pistons, said shoes adjacent their ends having projections thereon on their inner edges, said projections forming vertical shoulders and manually operated eccentrics carried by the plate and engaging the shoulders, said eccentrics forming adjustable stops for limiting inward movement of the shoes by the springs which connect the shoes together.

THOMAS DANIEL FUSSELL, Jr.